June 6, 1950 G. R. CLARK 2,510,072

INDICATOR SYSTEM

Filed Feb. 20, 1946

INVENTOR.
GILBERT R. CLARK

BY

R.P. Morris
ATTORNEY

Patented June 6, 1950 2,510,072

UNITED STATES PATENT OFFICE 2,510,072

INDICATOR SYSTEM

Gilbert R. Clark, Nutley, N. J., assignor to Federal Telephone and Radio Corporation, New York, N. Y., a corporation of Delaware Application February 20, 1946, Serial No. 649,063

9 Claims. (Cl. 177—353)

This invention relates to wave signalling systems and more particularly to a system for receiving and indicating signals which is singularly free from difficulties arising out of outside interference and which is capable of preserving secrecy of transmission and reception.

In systems of radio communication, it frequently becomes desirable to make it difficult for third parties to interfere with or to break in on the transmission and reception of communication. No system of communication is completely interference-proof, and the degree to which a system is protected against interference is, ordinarily, to a great extent dependent on the complexity of the apparatus. In common practice however, it is desirable to provide apparatus which is comparatively simple in construction, works from a relatively low power supply and may be operated by operators who are not highly skilled.

It is an object of the present invention to provide a communication system which is free of outside interference to a high degree.

It is another object to provide a communication system which is simple in construction and easy to operate.

It is a further object of this invention to provide means for receiving and separating out from signal energy certain predetermined frequencies which are made to convey intelligence indications.

A still further object of this invention is the provision of a communications receiving system which provides voltages of varying amplitude in accordance with desired indications.

According to certain features of the invention alphabetical and numerical characters are arranged in a given pattern on the screen of a cathode ray tube at the point of reception, the electron beam of the tube being made to move to given points on the screen to indicate successively by the resultant fluorescence thereon characters in accordance with the transmitted and received intelligence. The movement of the electron beam is controlled by the amplitude of vertical and horizontal deflection voltages which in turn are dependent on frequencies, which are the odd and even harmonics respectively of a given fundamental frequency conveying the intelligence; there being a particular harmonic couple (consisting of one odd and one even harmonic of a chosen fundamental frequency) corresponding to each character to be illuminated on said screen; and the amount of electron beam deflection, vectorially considered, being different for each harmonic couple. The received signals may be mixed with natural and human-made interference which tend to obscure them. To avoid this difficulty the received signals are subjected to the action of a so-called harmonic or synchronous filter which separates the odd and even harmonic frequencies related to a given fundamental and applies them to circuits for separating the odd from the even harmonics. These filters tend to store regularly repeated harmonic pulses cumulatively while random noise and interference will not accumulate. The resultant even and odd harmonics are then applied to circuits which convert the frequency signal into an amplitude modulated voltage signal for utilization by the cathode ray electron beam.

These and other objects and features of the invention will become more apparent upon consideration of the following detailed description of an embodiment to be read in connection with the accompanying drawings in which.

Figure 1:
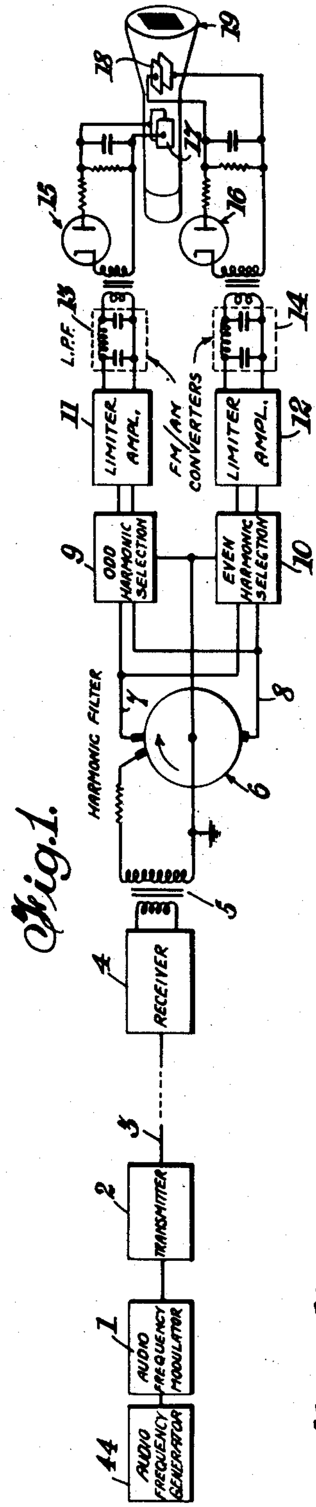
Fig. 1 is a block diagrammatic illustration of a signalling system embodying the invention.

In the drawing, the numeral 44 represents in block form any well-known form of audio frequency generator which is adapted to provide one even and one odd harmonic of a predetermined fundamental frequency for each of a number of characters the indications of which it is desired to transmit. The output of the audio generator 44 is applied to modulator 1 for the modulation of the high frequency of the output energy of a transmitter 2. The output of the transmitter 2, modulated by respective odd and even frequencies is then transmitted over any suitable communication channel such as a wire line 3 or over a radio channel. Merely for illustration, the drawing shows the channel 3 as being of the wire type. At the receiving end of the channel 3, the modulated high frequency intelligence is applied to a suitable receiver 4, which may for instance, eliminate the high frequency components of the received signal energy to leave only the audio frequency components for application to a coupling device such as a transformer 5. Thence, the intelligence which may include audio frequencies in a compartively wide range and which may have any amplitude is applied to a network which includes a special harmonic filter 6, which has the property of filtering out with a high degree of selectivity those frequencies which are the harmonics of a given fundamental frequency. This, I find can be accomplished by means of a synchronous or harmonic electro-mechanical filter which I shall describe in more detail in connection with Fig. 2. The odd and even harmonic frequencies thus filtered out and appearing combined in the filter output leads 7 and 8 are applied to respective selector circuits 9 and 10 which serve to separate the odd from the even harmonics. The respective outputs of the odd and even harmonic selectors, which may have been received at unpredictable amplitudes, are subjected to amplifying and limiting action in suitable limiter-amplifier circuits 11 and 12 and subsequently are passed through low-pass-filter circuits 13 and 14 which convert the respective frequency modulated energies into alternating current voltages having correspondingly modulated amplitudes. These voltages are then rectified by means of diodes 15 and 16 as shown, to provide suitable unidirectional deflection voltages for vertical and horizontal deflection plates, 17 and 18, respectively, of a cathode ray tube 19. The cathode ray tube has on the screen thereof a pattern of alphabetical and numerical characters which may be arranged in rectangular form as indicated in Fig. 3.

Figure 2:
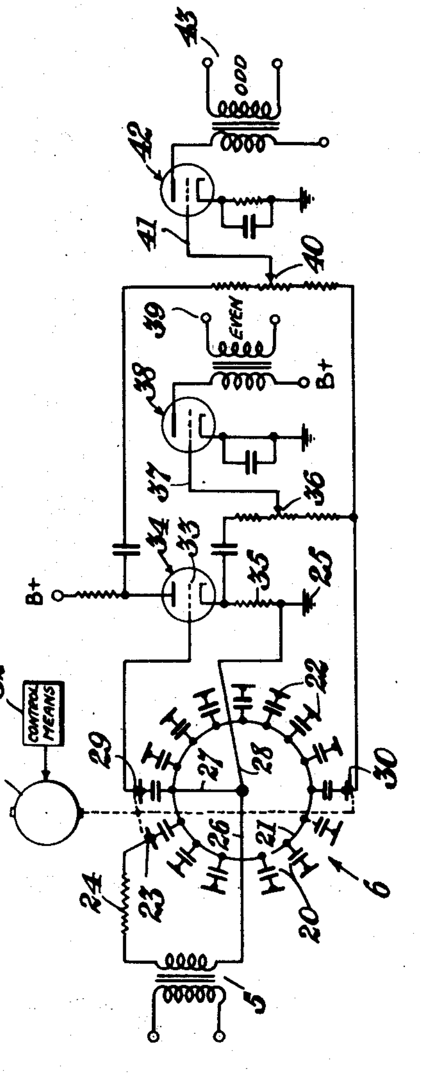
Fig. 2 is a circuit in schematic form of the filter system of the circuit of Fig. 1.
Figure 3:
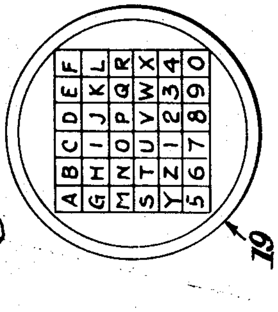
Fig. 3 is a view of the fluorescent screen of the cathode ray tube of the system shown in Fig. 1.

Referring now to the harmonic filter system shown in Fig. 2, the filter 6 is comprised of a bank of condensers 20 which have their corresponding plates or terminals multipled to a common conductor 21. The remaining corresponding plates or terminals of the condensers are connected to individually spaced and stationary distributor segments 22, arranged in a circular array in the nature of a commutator. Associated with these contact segments, so as to contact them successively, is a brush 23, which is connected through a resistor 24 to one terminal of the input transformer 5. The other terminal of the transformer 5 is connected to the condenser return conductor 21 and to ground at 25 over connectors 26, 27 and 28 respectively. Also, associated with the commutator segments are two other brushes 29 and 30, 180° apart, which are arranged to be rotated around the segments in contact therewith either at the same speed as brush 23 or at a multiple rate of speed with respect thereto. For this purpose, the brushes 23, 29 and 30 are connected to a common shaft which is driven at the required rate by motor 31. Preferably, motor 31 is speed-controlled by any well known device or source 32, so as to maintain its speed highly constant. Instead of driving the brushes, the brushes may be made stationary and the condenser unit rotated. Any applied frequency which is a multiple of the brush speed in revolutions per second applies the same polarity and magnitude of potential to each condenser 20 during each revolution. All other frequencies will tend both to charge and to discharge the condensers from time to time, that is, any energy wave having a frequency unrelated to the selected will at some points add and at some points subtract so that it will not cumulatively affect the condensers, as will the wave of selected frequency. By "selected frequency" is meant, of course, a wave having a frequency equal to or commensurate with the fundamental rotation speed of the brush 23. The take-off from the filter is obtained between the brushes 29 and 30 and the condenser return conductor 21. The take-off voltage thus attained is applied to a grid 33 of a coupling tube 34. A resistance 35 in cathode circuit of the tube 34 biases said tube sufficiently to prevent grid current from flowing at any time, thereby preventing a discharge of the condensers to ground by the operation of the tube 34. A cathode follower output across resistance 35 is balanced against the voltage output of the second brush 30 in a potentiometer 36. These two voltages are combined in connection 37 so that the odd harmonic voltages will have the same amplitude but opposite polarity and will therefore balance out in said connection 37 coupled to tube 38. As a consequence, only the even harmonics will be present in the output circuit 39. The anode circuit of the tube 34, in which the applied voltage will be phase inverted, is also balanced against the output from the brush 30 in a second potentiometer 40. Because of the phase inversion, the even harmonic voltages will be balanced out by adjustment of the potentiometer 40 so that only the odd harmonics are applied over a connecting lead 41 to tube 42, and only the odd harmonics will be present in the output circuit 43. It will be apparent that the circuits represented by the tubes 34, 38 and 42 in Fig. 2 are detailed representations of the odd and even harmonic selector circuits 9 and 10 respectively in Fig. 1.

The motor 31 drives the brush system of the filter 6 at a rotary speed which may for instance be 30 revolutions per second. Consequently, odd frequencies of, say 90, 150, 210, etc., and even harmonics of, say, 120, 180, 240, cycles per second may be filtered out by the synchronous device 6. If, therefore, a given character is identified at the point of transmission by wave energy having components, for instance, one at a frequency of 90, and the other at a frequency of 120 cycles per second, the take-off from the brushes 29 and 30 will contain energy at these two frequencies only for the period of time corresponding to the transmission of said given character. As already indicated in connection with the circuit of Fig. 2, this energy is therefore split up into its components containing the even and the odd frequencies respectively, that is, the odd harmonic selector 9 will pass the 90 cycle and the even harmonic selector will pass the 120 cycle component respectively. After suitable amplification and limitation of the amplitudes of these two components to a predetermined value, the application of the energy at these two frequencies to the low pass filters 13 and 14 which here act as frequency-to-amplitude converters, corresponding amplitude modulated voltages are obtained therefrom. Because of the low pass characteristics of circuits 13 and 14, the lower frequencies result in voltages having a higher amplitude than voltages due to high frequency energy. After rectification of these voltages which are of the alternating type, they are employed for vertical and horizontal deflection respectively of the electron beam in the cathode ray tube 19; the respective deflection being proportional to the amplitude of the two voltages applied. The result will be that the electron beam will impinge on the fluorescent screen at a location which corresponds to one of the characters as shown in Fig. 3. In the embodiment depicted, the selector circuits 9 and 10 are each capable of separating as many as six frequencies, which frequencies are determined by the rotary speed of the synchronous filter. The filter circuits 13 and 14 are similarly developed to pass a suitable band of frequencies providing larger outputs for the lower ones.

While I have not discussed any specific transmitter apparatus which may be used with the present system any transmission system may be employed to convey the desired frequencies from the audio frequency generator 44 to the transformer 5.

It will be seen from the above that I have provided a communication system which is simple in construction and operation, does not suffer from fading because of frequency modulation, and is to a high degree proof against outside interference.

While the above is a description of the principles of this invention in connection with specific apparatus, it is to be clearly understood that this description is made only by way of example and not as a limitation on the scope of this invention as defined in the accompanying claims.

I claim:

1. In a radio communications system, means for transmitting signals; means for generating an odd and an even harmonic of a predetermined fundamental frequency for each of a plurality of intelligence conveying characters, means for modulating the output of said transmitting means with said harmonics means for receiving signals, a rotary synchronous wave frequency filter to select from said signals energy at a plurality of said even and odd harmonic frequencies, said filter rotating at a speed which is synchronously proportional to said fundamental frequency, means for utilizing said selected energy to provide coordinate controlling voltages, a cathode ray tube having two sets of electron beam deflecting plates to which said voltages are applied for deflection of a character indicating electron beam, means for directing to one of said sets of deflecting plates only voltages derived from the odd wave harmonics, and means for directing to the other set of deflection plates only the voltages derived from the even harmonics.

2. A system according to claim 1, in which said means for utilizing said selected energy includes circuit means for separating said even from said odd harmonic frequency energy components.

3. A receiving arrangement for receiving intelligence signals which are characterized by an odd and an even harmonic of a predetermined fundamental frequency for each of a number of intelligence characters, said arrangement including a rotary synchronous wave frequency filter for filtering out energy at said odd and said even harmonic frequencies, means for separating the odd and even frequency components of the energy from said filter, means for converting said odd and even frequency energy components into two voltages in correspondence with the respective frequencies, and means for utilizing said voltages for producing a character signifying indication.

4. A receiving arrangement according to claim 3, in which said synchronous filter includes a bank of condensers and means for storing energy thereon which rotates with respect to said condensers at a rate which is synchronous with the fundamental frequency of said harmonic frequencies.

5. A receiving arrangement according to claim 3, in which said means for separating the components includes two take-off circuit means for said rotary filter to produce cancellation in said circuits of the even and odd harmonic frequency components respectively.

6. A receiving arrangement according to claim 3, in which said means for converting said components comprises low-pass-filter circuits to produce high voltages and low voltages for low and high frequency input respectively.

7. A receiving arrangement according to claim 3, in which said means for utilizing said voltages includes a cathode ray tube having a screen provided with a plurality of characters and also having two sets of deflection plates for controlling illumination of a selected character in accordance with a predetermined two-dimensional coordinate relationship, means for directing to one of said sets of deflection plates only the voltages derived from the odd frequency components, and means for directing to the other set of deflection plates the voltages derived from the even frequency components.

8. A receiving arrangement according to claim 3, in which said means for utilizing said voltages includes a rectifier for each of said two voltages, and a cathode ray tube having vertical and horizontal deflection plates for application thereto of the two respective rectified voltages.

9. A receiving arrangement for receiving intelligence signals which are characterized by an odd and an even harmonic of a predetermined fundamental frequency for each of a number of intelligence characters, said arrangement including a synchronous electro-mechanical wave filter having a bank of condensers and energy applying brush means rotating at a rate which is synchronous with the fundamental of said harmonic frequencies; two energy take-off circuits for said filter for cancelling out the even and odd harmonics respectively; each of said even and odd harmonic energy circuits comprising respectively: a limited-amplifier circuit, a low-pass filter circuit for converting frequency into voltage modulation, and a rectifier; a cathode ray tube having a screen provided with a plurality of characters positioned in accordance with a predetermined two-dimensional coordinate relationship, and means for applying said modulated voltages to said cathode ray tube to control the coordinate movement of the electron beam thereof.

GILBERT R. CLARK.

REFERENCES CITED

The following references are of record in the file of this patent:

UNITED STATES PATENTS

| Number | Name | Date |
|---|---|---|
| 2,137,888 | Fuller | Nov. 22, 1938 |
| 2,146,091 | Petersen | Feb. 7, 1939 |
| 2,283,383 | McNaney | May 19, 1942 |
| 2,363,671 | Hubbard | Nov. 28, 1944 |
| 2,404,238 | Loughlin et al. | July 17, 1946 |